May 18, 1965
J. T. POTTER
3,184,600
PHOTOSENSITIVE APPARATUS FOR MEASURING COORDINATE DISTANCES
Filed May 7, 1963
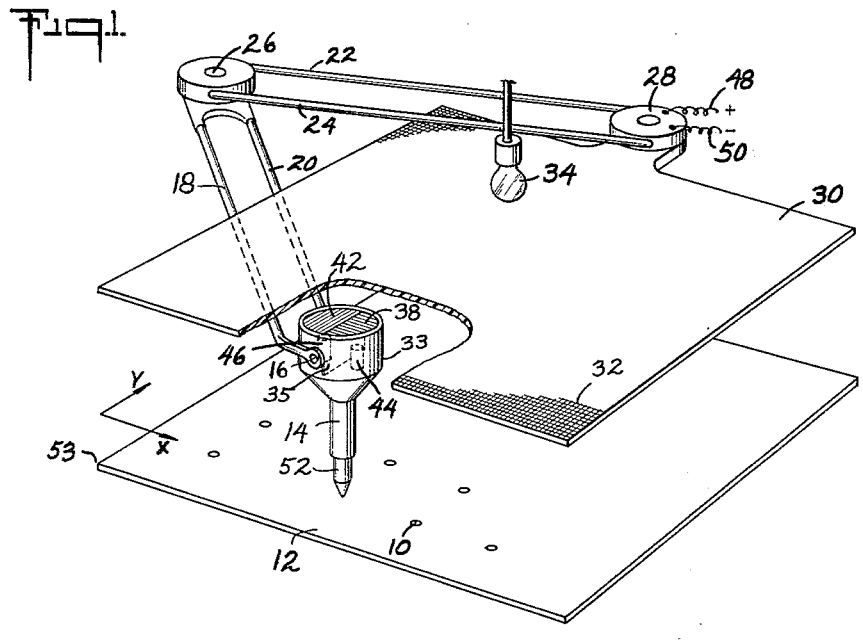
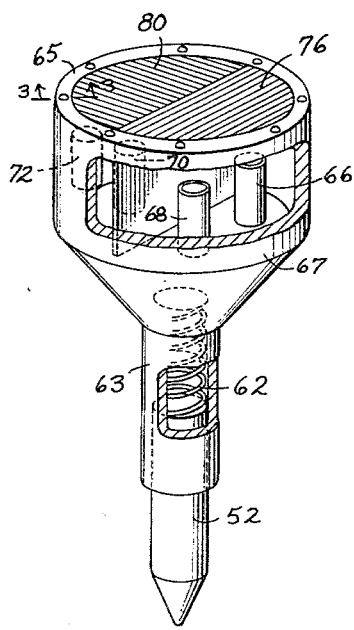
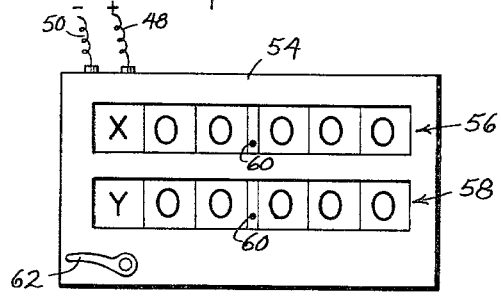
INVENTOR.
JOHN T. POTTER
BY Douglas M. Clarkson
ATTORNEY

United States Patent Office 3,184,600
Patented May 18, 1965

3,184,600
PHOTOSENSITIVE APPARATUS FOR MEASURING COORDINATE DISTANCES
John T. Potter, Center Island, N.Y., assignor to Potter Instrument Company, Inc., Plainview, N.Y., a corporation of New York
Filed May 7, 1963, Ser. No. 278,587
6 Claims. (Cl. 250—237)

This invention, generally, relates to measuring equipment and, more particularly, to an improved apparatus for measuring coordinate distances in simple, expedient and accurate manner.

Many mechanical devices are known to the art for the measurement of hole and line locations on templates, jigs, and other flat work. All of these devices depend upon mechanical linkages to transfer the movement increments and direction to detecting and indicating devices. Such linkages introduce measurement inaccuracies because of the difficulty of maintaining machining tolerances and because of inevitable wear of the linkage structure during use.

Therefore, it is a primary object of this invention to provide an improved apparatus for measuring coordinate distances in which the sensor for detecting incremental movement in each coordinate direction is coupled directly to the measuring stylus thereby to eliminate the dependency upon the maintenance of the tolerances in linkages during use.

In accordance with this object, there is provided, in a preferred embodiment of the present invention, a position-determining stylus which is carried on a mechanical linkage so as to be deflectable over the flat work to all of the hole and line locations marked thereon. The sensor for determining stylus movement is coupled to the stylus.

A grid is mounted over the sensor and consists of a translucent plate on which is imprinted parallel grid lines to a predetermined spacing. The grid is oriented so that the mutually perpendicular lines thereon are respectively aligned with the $x$ and $y$ coordinates.

The sensor is provided with a first and second photocell respectively provided with a screen formed of parallel opaque lines on a translucent base oriented with the $x$ and $y$ directions.

The sensor is mounted with the screens adjacent the grid and the lines on the respective screens aligned with the respective coordinate grid lines. Thus, as the sensor is moved along either coordinate direction, the interaction between the grid and the screen will set up an interference pattern of variation in incident illumination on the photocell associated with such respective coordinate direction.

The respective photocell then will produce a pulse output in which the number of pulses is related to the incremental movements, which pulses are totalized and indicated on counters. In this manner, the counters will provide a visual indication of the distance in each coordinate traversed by the sensor as it is moved from position to position.

The sensor assembly may be of such nature as to totalize the incremental coordinate movements by providing a circuitry for sensing the direction of movement and adding the movement in one direction and subtracting the movement in the other direction along both coordinate axes.

Additionally, the sensors and counters may be arranged so as to totalize movement to provide an indication of the measurement of hole and line locations from a fixed reference point which may be selected at any predetermined position.

The resolution of incremental distances moved depends upon the line spacing of the grid and the screens and may, thus, be made to the desired measurement accuracies. The accuracy initially established is maintained throughout use since motion transmitting linkages are not used.

Having briefly described this invention, it will be described in greater detail along with other objects and advantages in the following more detailed specification, which may best be understood by reference to the accompanying drawings, in which:

FIG. 1 is a partially broken away perspective view of a measuring apparatus constructed in accordance with the present invention;

FIG. 2 is a partially broken away enlarged view of the indicator shown in FIG. 1 according to another embodiment of this invention;

FIG. 3 is a section view taken along lines 3—3 of FIG. 2; and

FIG. 4 is a front view of a counter assembly convenient for use with the present invention.

In FIG. 1, there is shown a device for measuring the locations of holes 10 and the like on a flat plane 12, in accordance with the present invention. The apparatus comprises a stylus and sensor assembly 14 which is pivotably mounted by pins 16 to a set of parallel arms 18 and 20 of a parallelogram type suspension.

This suspension includes a coupling to parallel arms 22 and 24 by a bearing assembly 26 and a mounting to a reference location by a bearing assembly 28. By this mounting arrangement, the sleeve assembly 14 can be moved to any position along the plate 12 in simple manner.

However, the sensor assembly 14 will not be permitted to rotate with respect to the predetermined coordinate axes $x$ and $y$.

To sense the incremental movement from a reference point to any hole 10, there is provided a translucent plate 30 having opaque lines 32 imprinted, etched, engraved or otherwise formed thereon along both the $x$ and $y$ axes and separated by a predetermined increment. The grid lines 32 are shown in the figure to exaggerated scale for clarity.

A source of illumination, such as an electric bulb 34, projects light through the translucent plate 30. The sensor assembly 14 is provided with a head 33 of cylindrical form which is divided into two halves by a partition 35.

The open end of the head 33 is covered by grid lines 38 and 42 which join along the partition 35. Transparent plates may be used, if desired, on which are imprinted the opaque grid lines 38 extending in the $x$ coordinate direction and grid lines 42 in the $y$ direction, respectively.

Photoelectric cells 44 and 46 are positioned within the head under grid lines 38 and 42, respectively. The outputs from the photoelectric cells are transmitted by wires positioned within the arms of the parallelogram suspension to provide output signals to leads 48 and 50. The sensor assembly is held closely against the underside of the plate 30, and the stylus 52 is movable within the sleeve assembly 14 so as to maintain contact with the plate 12 to locate the holes 10 more accurately.

As the sleeve assembly 14 is moved from a reference point 53 (at one corner of the plate 12) to a specific hole 10 on the plate, the interaction between the grid lines 38 and the lines 32 on plate 30 will provide an interference pattern generating a plurality of pulses directly proportional to the incremental distance moved in the $y$ direction during such traverse. Similarly, grid lines 42 will provide an interference pattern which will be received by the photocell 46 to provide a plurality of pulses indicative of the incremental distance moved in the $x$ direction.

The line widths will determine the modulation. For example, if the line width is equal to the separation between lines, complete modulation of light from the source 34 will be obtained.

The respective pulses developed by the photocells 44 and 46 will be applied from the leads 48 and 50 to a totalizing counter 54, shown in FIG. 4, to display the incremental distance moved in the $x$ direction on dial 56 and the incremental distance in the $y$ direction on dial 58.

The incremental distance measured will be multiples of the spacing of the grids. For example, the lines in the grid 32 may be separated by 0.001 inch. In this case, the incremental movement totalized on the counter dials 56 and 58 will be measured to the nearest one-thousandths of an inch and the display may be provided with a decimal point 60 for direct reading. The counter may be reset to zero by a reset lever 62 so as to enable the selection of any desired reference point from which incremental distances are measured in convenient and expeditious fashion.

In many instances, it is desirable to provide a totalizing indicator so that the sleeve assembly 14 may be arbitrarily moved without regard to sense of movement. In such instances, it is necessary to provide totalization of incremental movements with an indication of the sense of movement.

In FIG. 2, there is shown a sensor assembly 63 which is identical in many respects to the assembly 14 of FIG. 1. The sensor assembly 63 is provided with a stylus 52 which is slidably mounted within the assembly and is urged by a spring 62 into an extended position for engagement with a plate.

A plurality of ball bearings 64, seen in more detail in FIG. 3, are preferably spaced about the upper rim 65 of the sensor head 67 so as to decrease the frictional co-efficient between the sensor and the underside of the plate 30 while, at the same time, providing precise parallel orientation of the grid and screens therebetween. Grid lines 76 and 80 are provided for detection of movement in the $y$ and $x$ directions respectively, similarly as described in connection with FIG. 1.

However, instead of a single photocell, two photocells are provided for each direction, namely, photocells 66 and 68 for the detection of movement in one direction. Similarly, photocells 70 and 72 are provided for the sensing of movement in the other direction.

The grid lines 76 and 80 are located at distances slightly different from the grid lines on plate 30. For example, if the plate 30 is provided with $n$ lines per inch, the grid lines 76 and 80 will be spaced at $n+1$ lines per inch.

Therefore, the interference pattern and the pulses generated by the spaced apart photocells 66, 68 and 70, 72 for the $y$ and $x$ directions, respectively, will have a phase difference enabling the circuitry to detect the sense or direction of movement. By this means, the circuitry can add the pulses caused by movement in one direction and subtract the pulses caused by movement in the other direction.

The circuitry to accomplish this, of course, is well known to the art and is not repeated here. By such arrangement, the sensor and stylus assembly can be moved from point to point along the plate, and the totalizer indicator will always provide the incremental measurement from a fixed reference.

This invention may be variously modified and embodied within the scope of the subjoined claims.

What is claimed is:

1. Apparatus for measurement of the incremental distance along coordinate axes between a reference point and another point spaced therefrom which comprises, means to define a first translucent plane mounted a predetermined distance above a second reference plane, a first plurality of opaque gird lines in the first plane extending in one direction defining the direction of one coordinate axis, a second plurality of opaque grid lines in the first plane extending in another direction defining a different coordinate axis, the grid lines of each plurality being spaced apart by a predetermined distance, a movable radiation sensor device having a housing with a third plurality of opaque grid lines extending in a direction parallel to one of the coordinate axes and a fourth plurality of opaque grid lines parallel to the other coordinate, said housing being smaller than said predetermined distance between said first and second planes, a pointed element connected directly to said housing so that the pointed element is moveable adjacent said second plane with said housing maintained adjacent said first plane, a radiation sensing element mounted within the housing on the opposite side of each of said third and fourth pluralities of opaque grid lines from said first and second opaque grid lines, a radiation source means positioned to emit radiations past said first, second, third and fourth opaque grid lines, means connected to said radiation sensing elements to generate a pulse output in response to modulation of the incident radiation by the interference pattern between the respective grid lines.

2. A combination in accordance with claim 1 which includes a counter device connected to count the pulses generated by each of said radiation sensing elements to indicate incremental movement in the two different coordinate directions.

3. A combination in accordance with claim 1 in which the line spacing on said first and second grid lines and said third and fourth grid lines are equal and in which said radiation sensing elements comprise a single photoelectric cell for each of said different coordinate axes.

4. A combination in accordance with claim 1 in which the incremental spacing between opaque grid lines in the first and second pluralities is different from the incremental spacing between the lines in the third and fourth pluralities, and in which said radiation sensing elements include at least two pair of spaced apart photoelectric cells thereby to generate pulse outputs responsive to the totalized incremental distance moved.

5. A combination in accordance with claim 4 which includes means for sensing the phase of the pulses produced by the respective photoelectric cells for adding the pulses corresponding to movement in one direction along each axis, and for subtracting the pulses corresponding to movement in the other direction along each axis.

6. Apparatus for measurement of the incremental distance along different coordinate axes between a reference point and a plurality of other points spaced therefrom, comprising, means to define a first translucent plane mounted a predetermined distance above a second reference plane, a first plurality of opaque grid lines in the first plane extending in one direction defining the direction of one coordinate axis, a second plurality of opaque grid lines in the first plane extending in another direction defining a different coordinate axis, the grid lines of each plurality being spaced apart by a predetermined distance, a movable radiation sensor device having a housing with a third plurality of opaque grid lines extending in a direction parallel to one of the coordinate axes and a fourth plurality of opaque grid lines extending in a direction parallel to the other coordinate axes, a partition dividing the interior of the housing into two separate compartments, the third plurality of opaque grid lines being located only on one side of the partition and the fourth plurality of opaque grid lines being located only on the other side of the partition, a radiation source means positioned on the opposite side of the first translucent plane from the second reference plane, the housing having an extended member so that the combined dimension of the housing and the extended member is less than the predetermined distance the first plane is above the second plane, a pointed element formed to fit in telescoping relation with the extended member of said housing to complete the span of said predetermined distance, at least two radiation sensing elements within the housing on each side of the partition to generate a pulse output in phase response to a modulation of the incident radiation developed by the interference pattern between the grid lines, and means connected to the housing to prevent rotational movement so that a preestablished positional relationship between all the grid lines is maintained as the housing is moved.

References Cited by the Examiner

UNITED STATES PATENTS

| | | | |
|---|---|---|---|
| 2,406,299 | 8/46 | Koulicovitch | 250—237 |
| 2,720,810 | 10/55 | Senn | 250—237 X |
| 3,114,046 | 12/63 | Cabaniss et al. | 250—237 |

FOREIGN PATENTS 635,316  9/36  Germany.

RALPH G. NILSON, *Primary Examiner.*

WALTER STOLWEIN, *Examiner.*